(12) United States Patent
Takechi (10) Patent No.: US 10,499,626 B2
(45) Date of Patent: Dec. 10, 2019

(54) DUAL-BEARING REEL

(71) Applicant: Shimano Inc., Sakai, Osaka (JP)

(72) Inventor: Kunio Takechi, Sakai (JP)

(73) Assignee: SHIMANO INC., Sakai, Osaka (JP)

( * ) Notice: Subject to any disclaimer, the term of this patent is extended or adjusted under 35 U.S.C. 154(b) by 65 days.

(21) Appl. No.: 15/883,615

(22) Filed: Jan. 30, 2018

(65) Prior Publication Data

US 2018/0332835 A1 Nov. 22, 2018

(30) Foreign Application Priority Data

May 17, 2017 (JP) ................................. 2017-098188

(51) Int. Cl.
*A01K 89/033* (2006.01)
*A01K 89/0155* (2006.01)
*A01K 89/02* (2006.01)

(52) U.S. Cl.
CPC ........ *A01K 89/047* (2015.05); *A01K 89/0155* (2013.01); *A01K 89/02* (2013.01); *A01K 89/046* (2015.05); *A01K 89/057* (2015.05); *A01K 89/058* (2015.05); *A01K 89/059* (2015.05)

(58) Field of Classification Search
CPC .............. A01K 89/0155; A01K 89/046; A01K 89/045; A01K 89/049; A01K 89/05; A01K 89/057; A01K 89/058; A01K 89/059; A01K 89/02
See application file for complete search history.

(56) References Cited

U.S. PATENT DOCUMENTS

| | | | | |
|---|---|---|---|---|
| 3,425,644 A | * | 2/1969 | Griste | A01K 89/059 242/270 |
| 4,056,246 A | * | 11/1977 | Purcell | A01K 89/058 242/270 |
| 4,131,245 A | * | 12/1978 | Noda | A01K 89/046 242/270 |
| 4,546,937 A | * | 10/1985 | Hideo | A01K 89/057 242/271 |
| 5,285,985 A | * | 2/1994 | Sakaguchi | A01K 89/057 242/302 |

(Continued)

FOREIGN PATENT DOCUMENTS

| | | |
|---|---|---|
| JP | H09275861 A | 10/1997 |
| JP | 2016220547 A | 12/2016 |

*Primary Examiner* — Michael R Mansen
*Assistant Examiner* — Raveen J Dias
(74) *Attorney, Agent, or Firm* — United IP Counselors, LLC (57) ABSTRACT

A dual-bearing reel includes a first reel body, a second reel body, a spool, a brake mechanism, a regulating member, an operating lever and a nut member. The brake mechanism brakes rotation of the spool. The regulating member is attached to the first reel body. The regulating member regulates a braking force to be applied by the brake mechanism. The regulating member has a tubular shape. The regulating member includes a screw part and a flange part. The screw part is provided on the outer peripheral surface of the regulating member. The flange part extends outward from the outer peripheral surface in a radial direction. The operating lever is attached to the regulating member, and is disposed between the flange part and the first reel body. The nut member is disposed between the operating lever and the first reel body, and is screwed onto the screw part.

20 Claims, 7 Drawing Sheets

(56) References Cited

U.S. PATENT DOCUMENTS

| | | | | |
|---|---|---|---|---|
| 5,348,247 A * | 9/1994 | Kaneko | A01K 89/059 | 242/303 |
| 6,293,483 B1 * | 9/2001 | Sato | A01K 89/0155 | 242/289 |
| 6,409,112 B1 * | 6/2002 | Hyon | A01K 89/058 | 242/285 |
| 6,412,720 B1 * | 7/2002 | Ikuta | A01K 89/01916 | 242/269 |
| 6,422,497 B1 * | 7/2002 | Kyon | A01K 89/006 | 242/267 |
| 6,860,442 B2 * | 3/2005 | Datcuk, Jr. | A01K 89/033 | 242/244 |
| 7,661,618 B2 * | 2/2010 | Takechi | A01K 89/0192 | 242/303 |
| 7,866,587 B2 * | 1/2011 | Ikuta | A01K 89/0178 | 242/270 |
| 2002/0023978 A1 * | 2/2002 | Ikuta | A01K 89/051 | 242/247 |
| 2003/0155459 A1 * | 8/2003 | Nilsen | A01K 89/0184 | 242/255 |
| 2005/0211812 A1 * | 9/2005 | Nakagawa | A01K 89/00 | 242/223 |
| 2010/0006690 A1 * | 1/2010 | Takechi | A01K 89/0192 | 242/396.5 |
| 2013/0161433 A1 * | 6/2013 | Takechi | A01K 89/059 | 242/243 |
| 2014/0014756 A1 * | 1/2014 | Yeh | A01K 89/058 | 242/285 |
| 2016/0345558 A1 * | 12/2016 | Niitsuma | A01K 89/0155 | |
| 2016/0345559 A1 * | 12/2016 | Ikuta | A01K 89/0187 | |
| 2017/0245484 A1 * | 8/2017 | Takechi | A01K 89/0188 | |
| 2018/0064083 A1 * | 3/2018 | Ikuta | A01K 89/0155 | |
| 2018/0295824 A1 * | 10/2018 | Svensson | A01K 89/046 | |
| 2018/0343842 A1 * | 12/2018 | Misseri | A01K 89/046 | |

* cited by examiner

DUAL-BEARING REEL

CROSS-REFERENCE TO RELATED APPLICATIONS

This application claims priority to Japanese Patent Application No. 2017-098188 filed on May 17, 2017, the entirety of which is hereby incorporated by reference in its entirety.

BACKGROUND

Technical Field

The present disclosure relates to a dual-bearing reel.

Background Information

Dual-bearing reels generally include a casting control mechanism. The casting control mechanism is a mechanism that regulates the rotation of a spool. For example, the casting control mechanism regulates the rotation of the spool in a clutch-off state by applying a friction force to a spool shaft unitarily rotated with the spool. By applying the friction force to the spool shaft, the rotational velocity of the spool is suppressed in releasing of a fishing line, and occurrence of backlash is prevented.

In a dual-bearing reel described in Japan Laid-open Patent Application Publication No. H09-275861, an operating lever is pivotably attached to a reel unit so as to easily operate a casting control mechanism. A braking force to be applied to a spool shaft can be regulated by pivoting the operating lever in a circumferential direction.

Japan Laid-open Patent Application Publication No. 2016-220547 discloses a configuration regarding a regulating member and an operating lever. The regulating member is attached to a reel unit so as to regulate a braking force to be applied to a spool shaft, and the operating lever is detachably attached to the regulating member. In this configuration, the operating lever is attached to the regulating member, and is then fixed thereto by fastening a nut member. In other words, the regulating member, the operating lever and the nut member are disposed in this order from the reel unit side.

In this configuration, when the nut member is loosened in, for instance, adjusting an angle at which the operating lever is attached, it is a concern that the nut member interferes with other members such as a handle because the nut member protrudes in a direction separating from the reel unit. Additionally, it is also a concern that the nut member is, when loosened, detached and drops from the reel unit.

BRIEF SUMMARY

In view of the above, it is an object of the present disclosure to prevent the nut member from protruding toward the handle and from being detached and dropping from the reel unit.

A dual-bearing reel according to an aspect of the present disclosure includes a first reel body, a second reel body, a spool, a brake mechanism, a regulating member, an operating lever and a nut member. The second reel body is disposed at an interval from the first reel body in an axial direction. The spool is disposed between the first reel body and the second reel body. The brake mechanism brakes rotation of the spool. The regulating member is attached to the first reel body and is configured to regulate a braking force to be applied by the brake mechanism. The regulating member has a tubular shape. The regulating member includes a screw part, which is provided on an outer peripheral surface thereof, and a flange part that extends outward from the outer peripheral surface in a radial direction. The operating lever is attached to the regulating member and is disposed between the flange part and the first reel body. The nut member is disposed between the operating lever and the first reel body. Moreover, the nut member is screwed onto the screw part of the regulating member.

According to this configuration, the nut member is screwed onto the screw part, whereby the operating lever is locked by the nut member and the flange part. Therefore, the operating lever becomes unitarily rotatable with the regulating member.

Additionally, when it is intended to adjust an angle at which the operating lever is attached to the regulating member, the nut member is loosened whereby the operating lever locked by the nut member and the flange part is released. As a result, the attachment angle of the operating lever becomes adjustable. Here, the nut member is disposed between the first reel body and the operating lever. Due to this, the nut member, when loosened, is moved not in a direction separating from the first reel body but in a direction approaching to the first reel body. Therefore, the nut member can be prevented from protruding toward a handle and from being detached and dropping from the reel unit.

Additionally, the operating lever is disposed between the flange part and the first reel body. Therefore, the flange part can prevent the operating lever from being moved in the direction separating from the first reel body and then being detached and dropping from the reel unit.

Preferably, the dual-bearing reel further includes a spool shaft that is unitarily rotated with the spool. In this case, the brake mechanism can indirectly brake the rotation of the spool by braking rotation of the spool shaft.

Preferably, one of the regulating member and the operating lever includes a plurality of engaging recesses that are aligned in a circumferential direction. Additionally, the other of the regulating member and the operating lever includes an engaging protrusion that is engaged with any of the plurality of engaging recesses.

According to this configuration, the engaging protrusion of the other of the regulating member and the operating lever is engaged with any of the plurality of engaging recesses of the one of the regulating member and the operating lever. Therefore, the angle at which the operating lever is attached to the regulating member is adjustable by adjusting with which of the plurality of engaging recesses the engaging protrusion is engaged.

Preferably, one of the regulating member and the operating lever includes a body member and a positioning member that is non-rotatably attached to the body member. Additionally, the plurality of engaging recesses are provided on the positioning member.

The plurality of engaging recesses can be provided on the regulating member, whereas the engaging protrusion can be provided on the operating lever. Alternatively, the plurality of engaging recesses can be provided on the operating lever, whereas the engaging protrusion can be provided on the regulating member.

Preferably, the dual-bearing reel further includes an urging member. The engaging protrusion can be an engaging pin that is disposed to be protrusible and retractable. The urging member urges the engaging pin toward the plurality of engaging recesses. According to this configuration, a hitting sound can be produced when the engaging position of the engaging pin is shifted from one to another among the plurality of engaging recesses by rotation of the operating lever.

Preferably, the operating lever includes a through hole that has an elongated shape and is penetrated by the regulating member.

Preferably, the engaging protrusion is disposed outside the through hole in a lengthwise direction of the through hole.

The engaging protrusion can protrude in the axial direction, or alternatively, can protrude in the radial direction.

Overall, according to the present disclosure, the nut member can be prevented from protruding toward the handle and from being detached and dropping from the reel unit.

BRIEF DESCRIPTION OF THE DRAWINGS

Referring now to the attached drawings which form a part of this original disclosure.

DETAILED DESCRIPTION OF EMBODIMENTS

A preferred embodiment of a dual-bearing reel according to the present disclosure will be hereinafter explained with reference to the attached drawings. It should be noted that in the following explanation, the term "axial direction" indicates an extending direction of a spool shaft. Additionally, the term "radial direction" indicates a radial direction of an imaginary circle about the spool shaft, whereas the term "circumferential direction" indicates a circumferential direction of the imaginary circle about the spool shaft.

<Dual-Bearing Reel>

Figure 1:
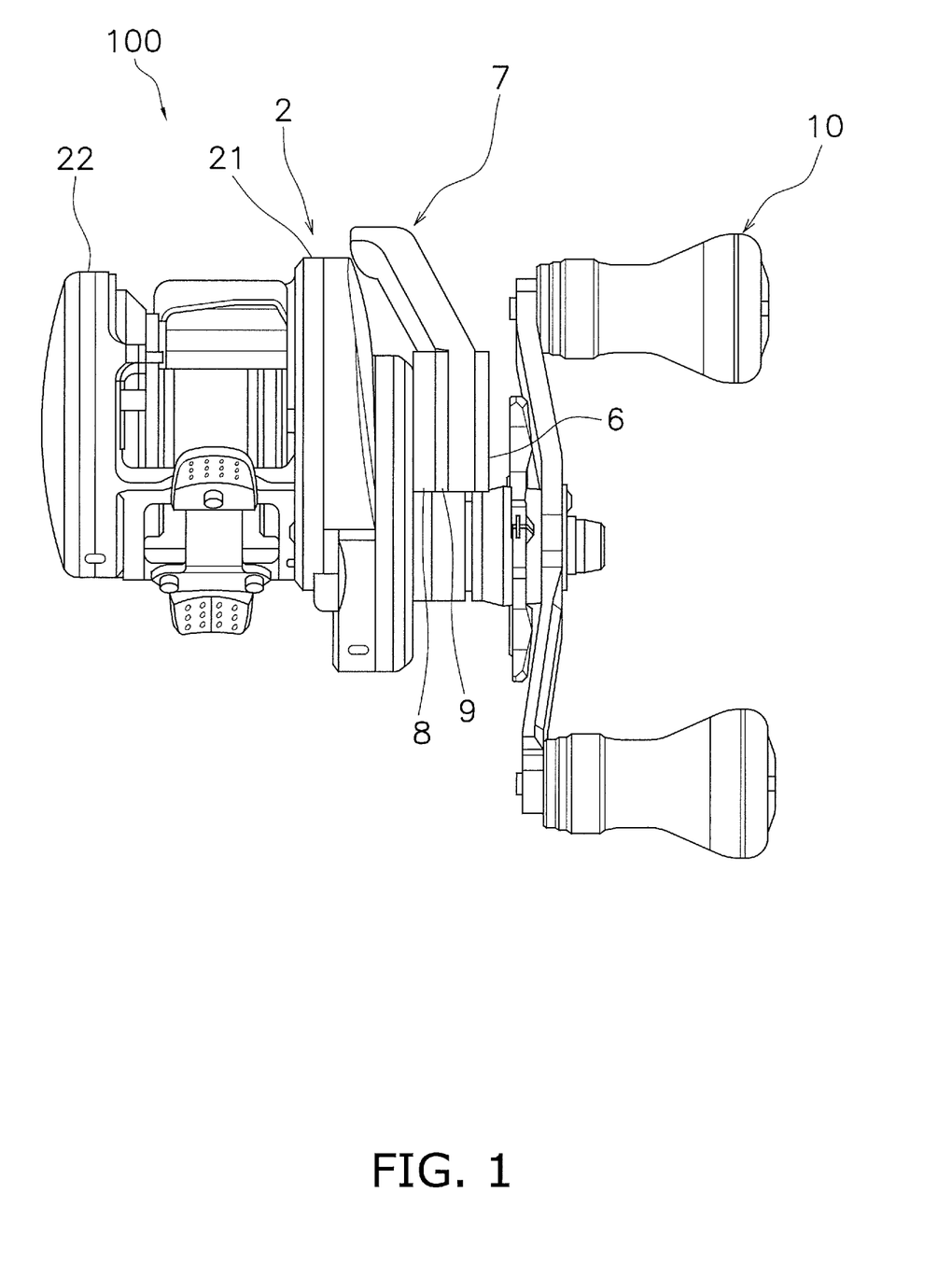
FIG. 1 is a rear view of a dual-bearing reel.
Figure 2:
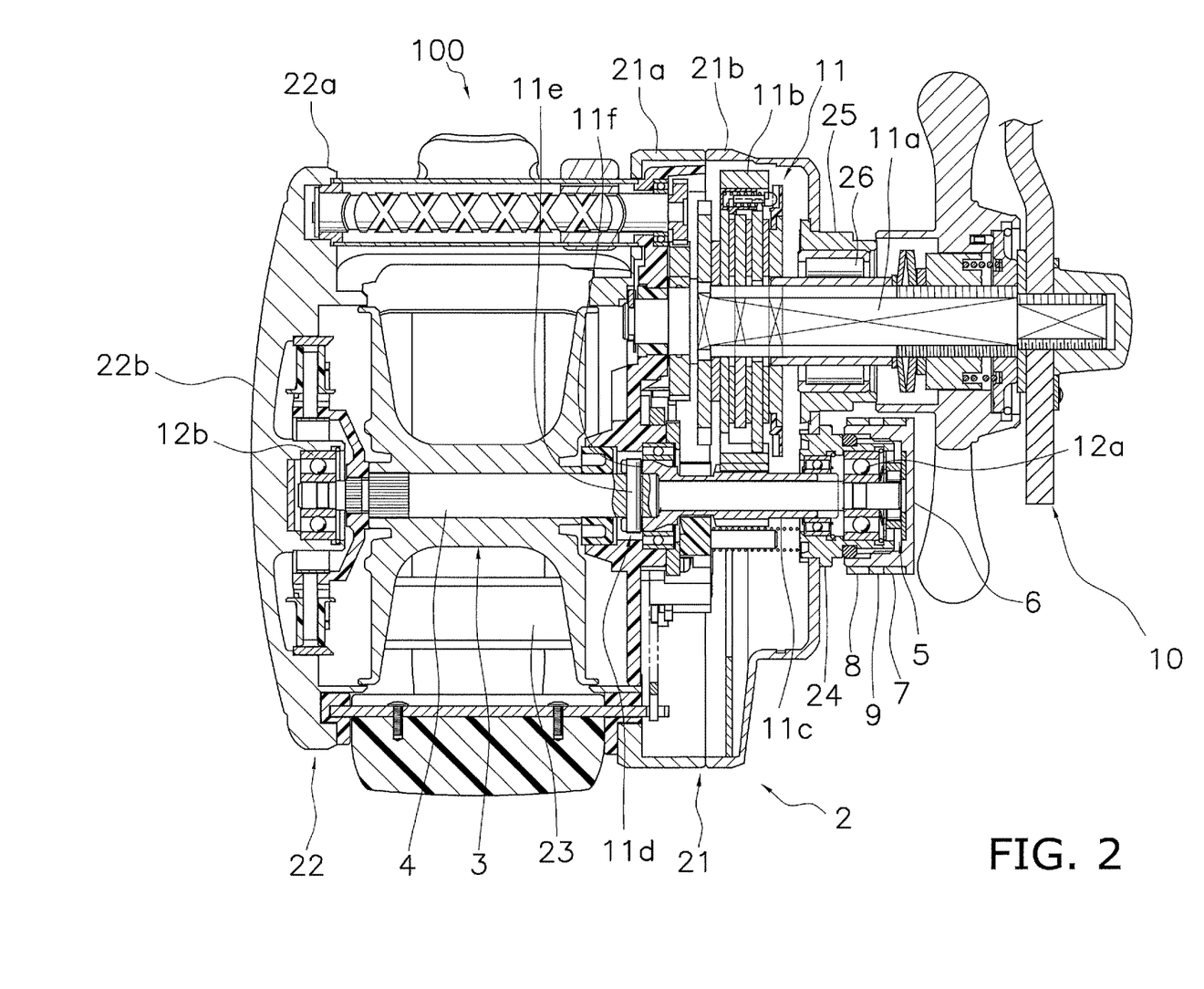
FIG. 2 is a cross-sectional view of the dual-bearing reel.

As shown in FIGS. 1 and 2, a dual-bearing reel 100 includes a reel unit 2, a spool 3, a spool shaft 4, a brake mechanism 5, a regulating member 6, an operating lever 7 and a nut member 8.

<Reel Unit>

The reel unit 2 includes a first reel body 21 and a second reel body 22. The first reel body 21 and the second reel body 22 are disposed at an interval in the axial direction. The first reel body 21 and the second reel body 22 are coupled to each other through a plurality of coupling parts 23.

As shown in FIG. 2, the first reel body 21 includes a first side plate 21a and a first cover 21b. The first reel body 21 includes an accommodation space in the interior thereof. The accommodation space accommodates a rotation transmission mechanism 11 and so forth. The second reel body 22 includes a second side plate 22a and a second cover 22b. The first side plate 21a and the second side plate 22a are coupled to each other through the coupling parts 23. The first side plate 21a, the second side plate 22a and the coupling parts 23 are integrally formed and compose the frame of the reel unit 2.

The first reel body 21 further includes a first boss part 24 and a second boss part 25. The first boss part 24 and the second boss part 25 are disposed at an interval from each other. Each of the first and second boss parts 24 and 25 has a cylindrical shape and protrudes outward in the axial direction. Detailedly, each of the first and second boss parts 24 and 25 protrudes outward from the first cover 21b in the axial direction.

Figure 3:
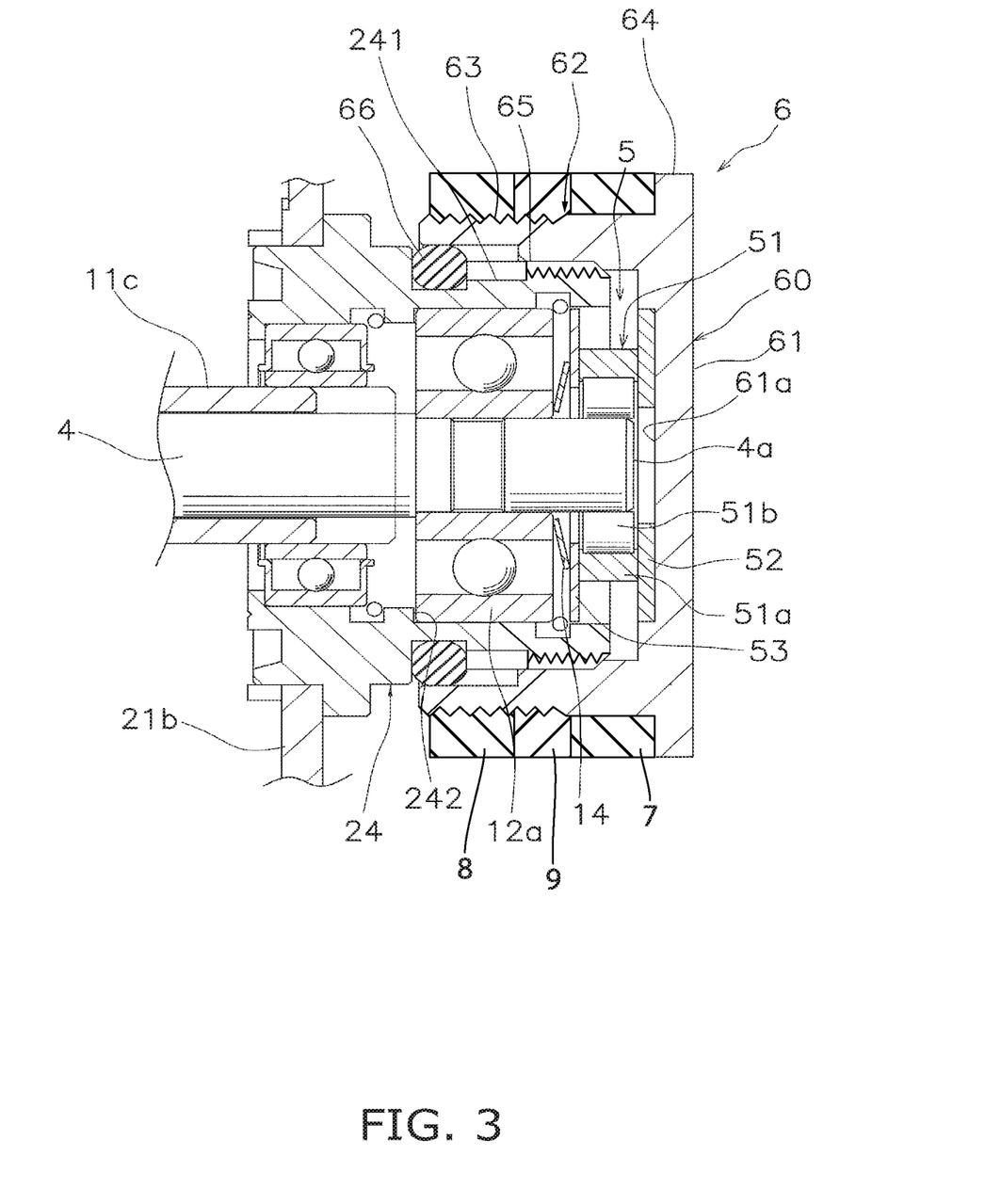
FIG. 3 is an enlarged cross-sectional view of the dual-bearing reel.

The first boss part 24 includes a screw part 241 on the outer peripheral surface thereof (see FIG. 3). The regulating member 6 is attached to the first boss part 24. Detailedly, the regulating member 6 is screwed onto the first boss part 24. The second boss part 25 is disposed at an interval from the first boss part 24. Therefore, the second boss part 25 is disposed at an interval from the regulating member 6 attached to the first boss part 24.

The accommodation space of the first reel body 21 and the outside are communicated through the first and second boss parts 24 and 25. One end of the spool shaft 4 is rotatably supported inside the first boss part 24. On the other hand, a drive shaft 11a is supported inside the second boss part 25 through a one-way clutch 26 so as to be rotatable in a fishing line winding direction.

<Spool>

The spool 3 is disposed between the first reel body 21 and the second reel body 22. Detailedly, the spool 3 has an approximately cylindrical shape and extends in the axial direction. The spool 3 is rotatable with respect to the reel unit 2. The spool 3 is rotatably supported by the reel unit 2 through the spool shaft 4.

<Spool Shaft>

The spool shaft 4 is unitarily rotated with the spool 3. The spool shaft 4 is rotatably supported by the first and second reel bodies 21 and 22. It should be noted that the spool shaft 4 is rotatably supported by the first and second reel bodies 21 and 22 through first and second bearing members 12a and 12b.

<Handle>

A handle 10 is a member for rotating the spool shaft 4, and is rotatably attached to the first reel body 21. When the handle 10 is rotated, the spool shaft 4 is rotated through the rotation transmission mechanism 11.

<Rotation Transmission Mechanism>

The rotation transmission mechanism 11 is a mechanism that transmits the rotation of the handle 10 to the spool shaft 4. The rotation transmission mechanism 11 includes the drive shaft 11a, a drive gear 11b, a pinion gear 11c and a clutch mechanism 11d. The drive shaft 11a is unitarily rotated with the handle 10. The drive gear 11b is unitarily rotated with the drive shaft 11a. The pinion gear 11c is meshed with the drive gear 11b. The pinion gear 11c has a tubular shape, and the spool shaft 4 penetrates the interior of the pinion gear 11c.

The clutch mechanism 11d is configured to allow or block transmitting the rotation of the pinion gear 11c to the spool shaft 4. The clutch mechanism 11d can be set in a clutch-off state and a clutch-on state. The spool 3 is made freely rotatable in the clutch-off state of the clutch mechanism 11d, whereas the spool 3 becomes able to wind the fishing line in the clutch-on state of the clutch mechanism 11d. Specifically, the clutch mechanism 11d is composed of an engaging pin 11e and an engaging recess 11f. The engaging pin 11e penetrates the spool shaft 4 in the radial direction. The engaging recess 11f is a recess provided on one end of the pinion gear 11c.

When the clutch mechanism 11d is set in the clutch-on state, the engaging pin 11e is engaged with the engaging recess 11f. As a result, the rotation of the pinion gear 11c is transmitted to the spool shaft 4, whereby the spool 3 becomes able to wind the fishing line. On the other hand, when the clutch mechanism 11d is set in the clutch-off state, the pinion gear 11c is moved in a direction separating from the engaging pin 11e, whereby the engaging pin 11e and the engaging recess 11f are disengaged from each other. As a result, the rotation of the pinion gear 11c is not transmitted to the spool shaft 4, whereby the spool 3 becomes freely rotatable.

<Brake Mechanism>

The brake mechanism 5 is configured to brake the rotation of the spool shaft 4 when the clutch mechanism 11d is set in the clutch-off state. The spool shaft 4 is unitarily rotated with the spool 3. Hence, the brake mechanism 5 is capable of braking the rotation of the spool 3 by braking the rotation of the spool shaft 4. Thus, the brake mechanism 5 is an example of a means for braking rotation of the spool 3. Detailedly, as shown in FIG. 3, the brake mechanism 5 includes a one-way clutch 51, a first friction plate 52 and a second friction plate 53.

The one-way clutch 51 is attached to the spool shaft 4. The one-way clutch 51 includes an outer race 51a and a plurality of rolling elements 51b. The outer race 51a is rotatable with respect to the reel unit 2. Detailedly, the outer race 51a is rotatable with respect to the first boss part 24. The outer race 51a is disposed at a gap from the inner peripheral surface of the first boss part 24.

The outer race 51a is axially interposed and held between the first friction plate 52 and the second friction plate 53. In other words, the rotation of the outer race 51a is braked by the first and second friction plates 52 and 53.

The rolling elements 51b are disposed between the spool shaft 4 and the outer race 51a. The rolling elements 51b transmit the fishing line releasing directional rotation of the spool shaft 4 to the outer race 51a. On the other hand, the rolling elements 51b do not transmit the fishing line winding directional rotation of the spool shaft 4 to the outer race 51a.

The first friction plate 52 is disposed between the outer race 51a of the one-way clutch 51 and a disc part 61 of the regulating member 6. The first friction plate 52 is an annular plate and makes contact with the outer race 51a. It should be noted that the first friction plate 52 makes contact with the outer race 51a but does not make contact with the rolling elements 51b. The first friction plate 52 is made of, for instance, carbon cloth. The disc part 61 of the regulating member 6 axially presses the outer race 51a through the first friction plate 52.

The second friction plate 53 has an annular shape and makes contact with the outer race 51a of the one-way clutch 51. The outer race 51a is interposed between the first friction plate 52 and the second friction plate 53. It should be noted that the second friction plate 53 does not make contact with the rolling elements 51b.

<Urging Member>

An urging member 14 urges the outer race 51a of the one-way clutch 51 toward the disc part 61 of the regulating member 6. In other words, the urging member 14 urges the outer race 51a so as to prevent the outer race 51a from being separated from the first friction plate 52. It should be noted that the urging member 14 urges the outer race 51a through the second friction plate 53.

The urging member 14 is restricted from axially moving away from the one-way clutch 51. Specifically, the urging member 14 is supported by the first bearing member 12a. The first bearing member 12a is restricted from moving away from the one-way clutch 51 by a step part 242 provided on the inner peripheral surface of the first boss part 24.

The urging member 14 is, for instance, a disc spring. The outer peripheral part of the urging member 14 urges the outer race 51a of the one-way clutch 51 through the second friction plate 53. On the other hand, the inner peripheral part of the urging member 14 is supported by the inner race of the first bearing member 12a. Even when the urging member 14 is completely compressed, an end surface 4a of the spool shaft 4 does not make contact with a bottom surface 61a of the regulating member 6.

<Regulating Member>

The regulating member 6 is attached to the first boss part 24 of the first reel body 21. The regulating member 6 has a cylindrical shape. Detailedly, the regulating member 6 includes the disc part 61 and a tubular part 62 that axially extends from the outer peripheral end of the disc part 61.

Additionally, the regulating member 6 includes a screw part 63 and a flange part 64. The screw part 63 is provided on the outer peripheral surface of the tubular part 62. The flange part 64 radially extends from the outer peripheral surface of the tubular part 62.

The regulating member 6 also includes a screw part 65 provided on the inner peripheral surface of the tubular part 62. The screw part 65 is screwed onto the screw part 241 provided on the outer peripheral surface of the first boss part 24 of the reel unit 2. Therefore, the regulating member 6 is moved in the axial direction when rotated about the rotational axis of the spool shaft 4.

The regulating member 6 is capable of regulating the braking force for braking the rotation of the spool shaft 4. In other words, the regulating member 6 is capable of regulating the braking force applied by the brake mechanism 5. Thus, the regulating member 6 is an example of a means for regulating a braking force to be applied by the brake mechanism 5. It should be noted that in the present preferred embodiment, the spool shaft 4 and the outer race 51a are rotated in conjunction with each other when the spool shaft 4 is rotated in the fishing line releasing direction. Therefore, the regulating member 6 is capable of regulating the braking force for braking the rotation of the spool shaft 4 by regulating the braking force for braking the rotation of the outer race 51a. Specifically, when the regulating member 6 is rotated to be moved in the axial direction, the force of the regulating member 6 pressing the outer race 51a can be regulated, whereby the braking force for braking the outer race 51a can be regulated. It should be noted that the regulating member 6 presses the outer race 51a through the first friction plate 52.

A seal member 66 is disposed between the inner peripheral surface of the regulating member 6 and the outer peripheral surface of the first boss part 24. The seal member 66 can prevent foreign objects from intruding into the interior of the reel unit 2. Additionally, the seal member 66 applies rotational resistance to the regulating member 6 so as to prevent a situation that the regulating member 6 is rotated against the intention of an angler.

The regulating member 6 includes a body member 60 and a positioning member 9. The body member 60 and the positioning member 9 are provided as members separated from each other. It should be noted that the body member 60 includes the aforementioned parts such as the disc part 61 and the tubular part 62.

Figure 4:
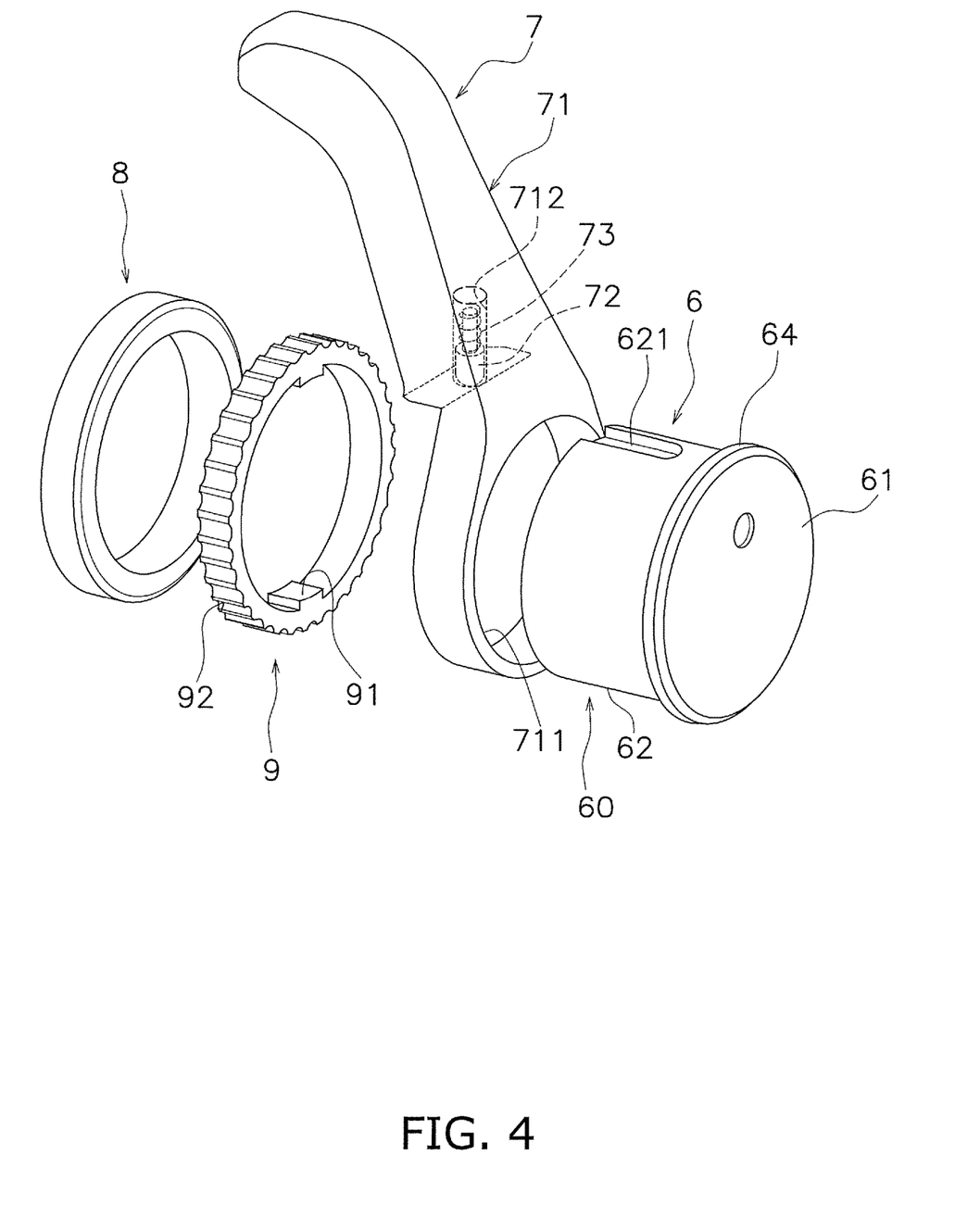
FIG. 4 is an enlarged exploded perspective view of the dual-bearing reel.

The positioning member 9 is non-rotatably attached to the body member 60. Detailedly, the positioning member 9 has a cylindrical shape. Additionally, the positioning member 9 includes keys 91 provided on the inner peripheral surface thereof. The keys 91 are engaged with key grooves 621 provided on the outer peripheral surface of the tubular part 62 of the body member 60. As a result, the positioning member 9 is non-rotatably attached to the body member 60. In other words, the positioning member 9 is unitarily rotated with the body member 60. It should be noted that the positioning member 9 is axially slidable against the body member 60.

Additionally, the positioning member 9 includes a plurality of engaging recesses 92 aligned in the circumferential direction. The respective engaging recesses 92 are provided on the outer peripheral surface of the positioning member 9. An engaging protrusion (e.g., an engaging pin) 72 (to be described) is engaged with any one of the plural engaging recesses 92.

<Operating Lever>

As shown in FIG. 4, the operating lever 7 is detachably attached to the regulating member 6. The operating lever 7 is disposed axially between the flange part 64 and the first reel body 21. Additionally, the operating lever 7 is disposed to be pivotable in the circumferential direction. It should be noted that the operating lever 7 is unitarily rotated with the regulating member 6. Specifically, when the operating lever 7 is pivoted, the regulating member 6 is rotated about the rotational axis of the spool shaft 4.

The operating lever 7 includes an operating lever body 71, the engaging pin 72 and an urging member 73. The operating lever body 71 radially extends from the regulating member 6.

Additionally, the operating lever body 71 extends toward the second reel body 22. Specifically, the operating lever body 71 is curved and bent such that the tip end thereof faces the first reel body 21.

The operating lever body 71 includes a through hole 711 in a base end-side part thereof. The tubular part 62 of the regulating member 6 penetrates the through hole 711. Additionally, the operating lever body 71 includes an accommodation space 712 that accommodates the engaging pin 72. The accommodation space 712 radially extends and opens radially inward.

The engaging pin 72 is attached to the operating lever body 71 so as to be protrusible therefrom and be retractable thereto. Detailedly, the engaging pin 72 is accommodated in the accommodation space 712 of the operating lever body 71. The engaging pin 72 is urged toward the engaging recesses 92. In the present preferred embodiment, the engaging pin 72 is urged radially inward by the urging member 73. Thus, the urging member 73 is an example of a means for urging the engaging pin 72 toward the plurality of engaging recesses 92. Therefore, the engaging pin 72 is set to protrude at the tip end thereof from the operating lever body 71. It should be noted that the engaging pin 72 is moved radially outward against the urging force of the urging member 73 when the tip end of the engaging pin 72 is pressed radially outward.

<Nut Member>

The nut member 8 is screwed onto the screw part 63 of the regulating member 6. The nut member 8 is disposed between the operating lever 7 and the first reel body 21. In more detail, the nut member 8 is disposed between the positioning member 9 and the first reel body 21. In other words, the nut member 8, the positioning member 9, the operating lever 7, and the flange part 64 of the regulating member 6 are aligned in this order from the first reel body 21 side. When the nut member 8 is screwed onto the screw part 63 of the regulating member 6 while the members are aligned in the aforementioned order, the operating lever 7 and the positioning member 9 can be locked by the nut member 8 and the flange part 64. Thus, the nut member 8 is an example of a means for locking the operating lever 7 and the positioning member 9.

<Action of Dual-Bearing Reel>

Next, the action of the dual-bearing reel 100 will be explained. In casting to release the fishing line from the spool 3, the spool shaft 4 is rotated in the fishing line releasing direction. The fishing line releasing directional rotation of the spool shaft 4 is transmitted to the outer race 51a of the one-way clutch 51 through the rolling elements 51b, whereby the outer race 51a is rotated. The outer race 51a is pressed by the regulating member 6 through the first friction plate 52. In other words, the outer race 51a is braked by the brake mechanism 5. Hence, the rotational velocity of the spool shaft 4 unitarily rotated with the outer race 51a is suppressed. The spool shaft 4 and the spool 3 are actuated in conjunction with each other. Hence, the rotational velocity of the spool 3 is also suppressed in releasing the fishing line, whereby occurrence of backlash is prevented.

When the operating lever 7 is pivoted in the circumferential direction, the regulating member 6 is rotated and moved in the axial direction. Accordingly, the braking force to be applied by the brake mechanism 5 can be regulated. In other words, the braking force to be applied to the spool shaft 4 can be regulated by pivoting the operating lever 7 in the circumferential direction. It should be noted that the operating lever 7 can be operated by, for instance, a hand of the angler holding the second reel body 22.

In winding the fishing line, the spool shaft 4 is rotated in the fishing line winding direction. The rolling elements 51b do not transmit the fishing line winding directional rotation of the spool shaft 4 to the outer race 51a. In other words, the spool shaft 4 and the outer race 51a are not actuated in conjunction with each other, whereby the braking force applied by the brake mechanism 5 does not act on the spool shaft 4. Therefore, in winding the fishing line, rotational resistance is not generated in the spool shaft 4 by the brake mechanism 5, whereby the spool shaft 4 is smoothly rotatable.

In changing the attachment angle of the operating lever 7, the nut member 8 is firstly rotated and loosened. As a result, the operating lever 7 locked by the nut member 8 and the flange part 64 is released, and becomes circumferentially rotatable with respect to the regulating member 6. The nut member 8 is herein disposed between the first reel body 21 and the operating lever 7. Hence, when loosened, the nut member 8 is moved not in a direction separating from the first reel body 21 but in a direction approaching to the first reel body 21. Consequently, the nut member 8 can be prevented from protruding toward the handle 10 and from being detached and dropping from the reel unit 2.

Additionally, the operating lever 7 is disposed between the flange part 64 and the first reel body 21. Therefore, the flange part 64 can prevent the operating lever 7 from being moved in the direction separating from the first reel body 21 and then being detached and dropping from the reel unit 2.

It should be noted that the engaging pin 72 of the operating lever 7 and one of the engaging recesses 92 of the positioning member 9 are engaged. Hence, it is possible to appropriately adjust the angle that the operating lever 7 is attached. Additionally, in rotating the operating lever 7, a hitting sound is produced between the engaging pin 72 and the engaging recesses 92 every time the engaging position of the engaging pin 72 is shifted from one to another among the engaging recesses 92.

One preferred embodiment of the present disclosure has been explained above. However, the present disclosure is not limited to the above, and a variety of changes can be made without departing from the gist of the present disclosure.

Modification 1

Figure 5:
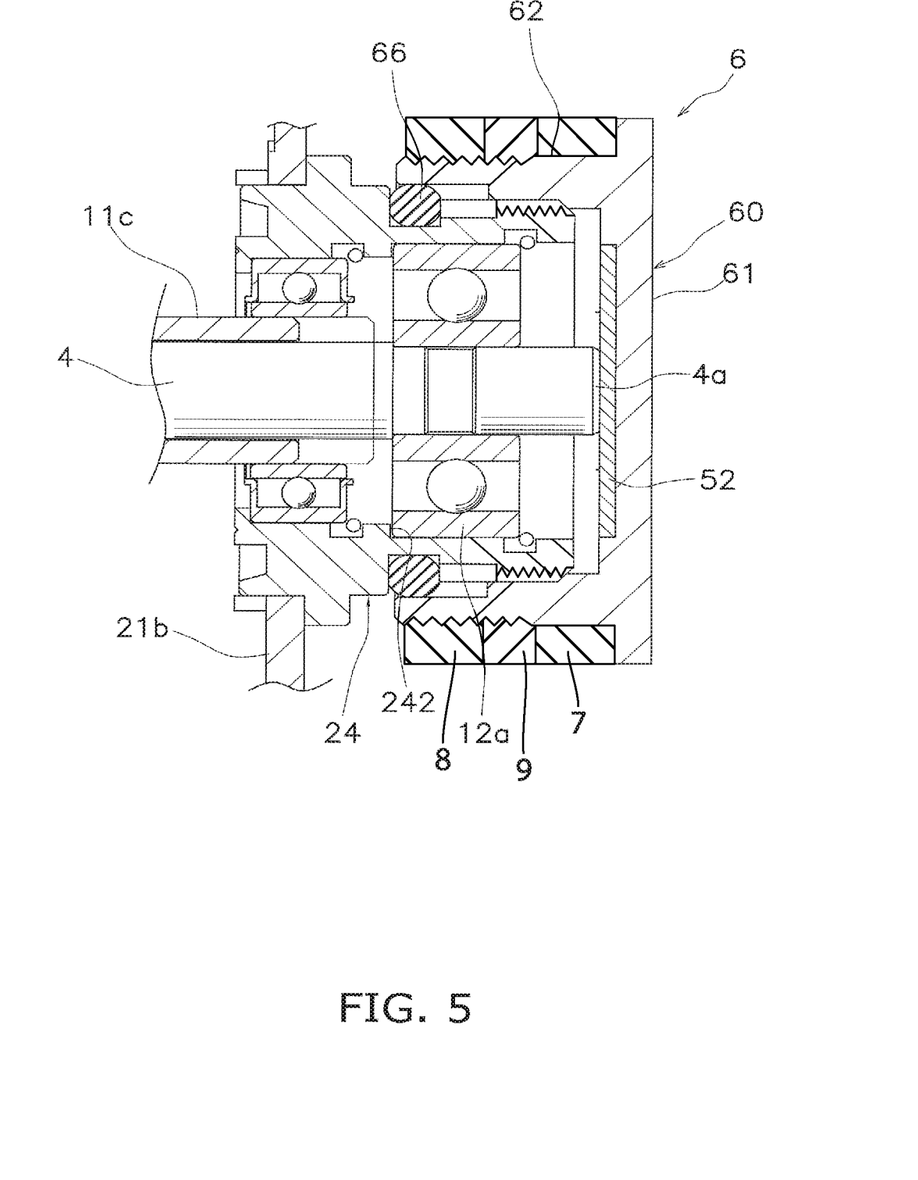
FIG. 5 is an enlarged cross-sectional view of a dual-bearing reel according to a modification.

In the aforementioned preferred embodiment, the brake mechanism 5 is composed of the one-way clutch 51, the first friction plate 52 and the second friction plate 53. However, the composition of the brake mechanism 5 is not particularly limited to this as long as the brake mechanism 5 is capable of braking the rotation of the spool shaft 4. For example, as shown in FIG. 5, the brake mechanism 5 can be composed of only the first friction plate 52. In other words, the brake mechanism 5 may not be provided with the one-way clutch 51 and the second friction plate 53. In this case, the first friction plate 52 makes contact with the end surface 4a of the spool shaft 4 and directly brakes the rotation of the spool shaft 4. It should be noted that according to this configuration, the brake mechanism 5 brakes the rotation of the spool shaft 4 not only in the clutch-off state but also in the clutch-on state.

Alternatively, the brake mechanism 5 can be composed of the disc part 61 of the regulating member 6. In other words, the brake mechanism 5 may not be provided with the one-way clutch 51, the first friction plate 52 and the second friction plate 53. In this case, the disc part 61 makes contact with the end surface 4a of the spool shaft 4 and directly brakes the rotation of the spool shaft 4. According to this configuration, the brake mechanism 5 brakes the rotation of the spool shaft 4 not only in the clutch-off state but also in the clutch-on state.

Modification 2

Figure 6:
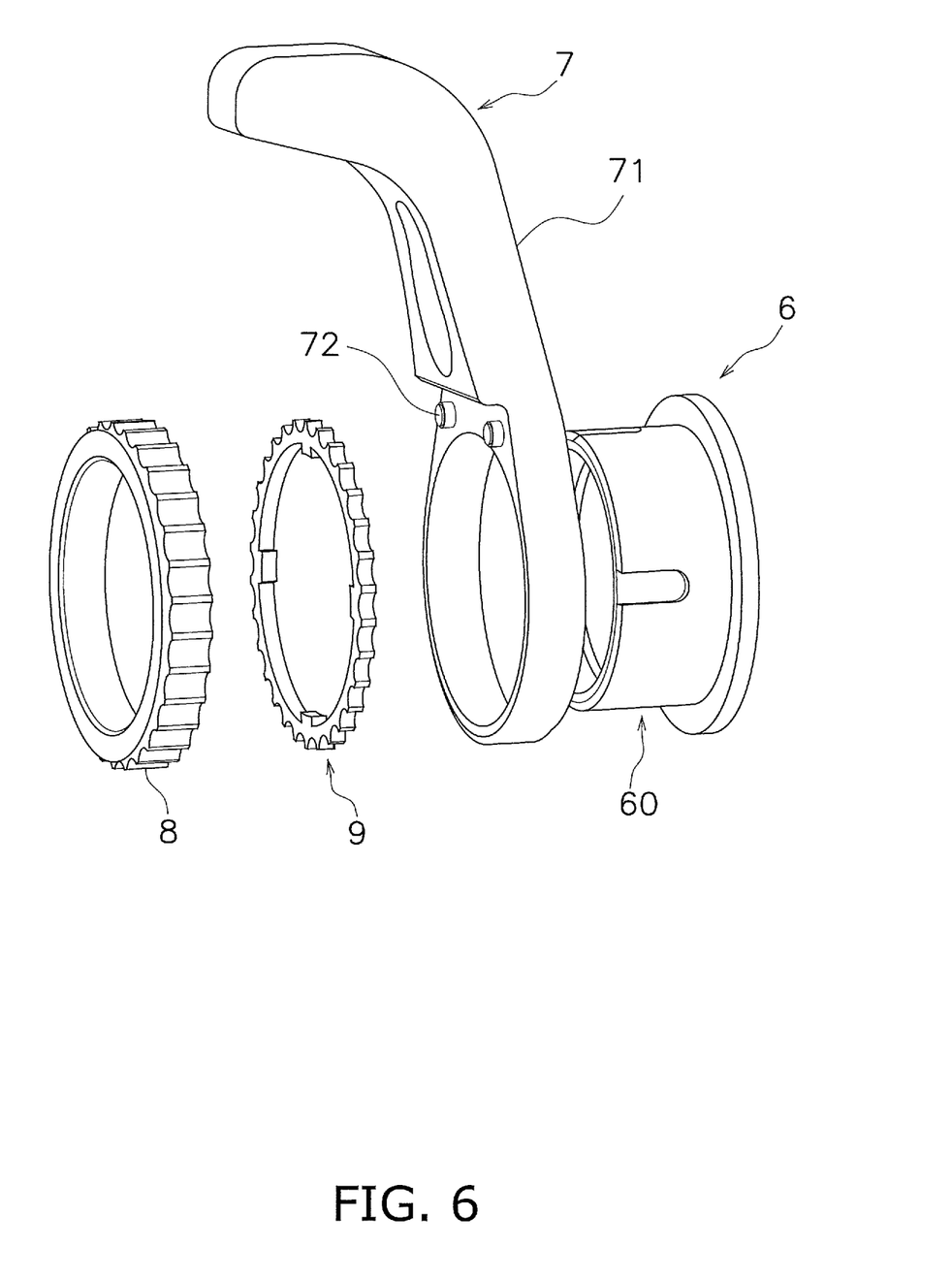
FIG. 6 is an enlarged exploded perspective view of a dual-bearing reel according to another modification.

In the aforementioned preferred embodiment, the engaging pin 72, provided as an exemplary engaging protrusion, is provided as a member separated from the operating lever body 71. However, the engaging protrusion 72 can be integrated with the operating lever body 71. In other words, the engaging protrusion 72 can be non-protrusible from and non-retractable to the operating lever body 71. For example, as shown in FIG. 6, the engaging protrusions 72 are integrated with the operating lever body 71. Additionally, the engaging protrusions 72 can axially protrude from the operating lever body 71. Detailedly, the engaging protrusions 72 axially protrude from the operating lever body 71 toward the positioning member 9. The engaging protrusions 72 are engaged with two of the plural engaging recesses 92 of the positioning member 9. In the present modification, two engaging protrusions 72 are provided. However, the number of the engaging protrusions 72 is not limited to two.

Modification 3

Additionally, in the aforementioned preferred embodiment, the regulating member 6 includes the positioning member 9. However, the regulating member 6 may not include the positioning member 9. In other words, the operating lever 7 can be directly locked by the nut member 8 and the flange part 64.

Figure 7:
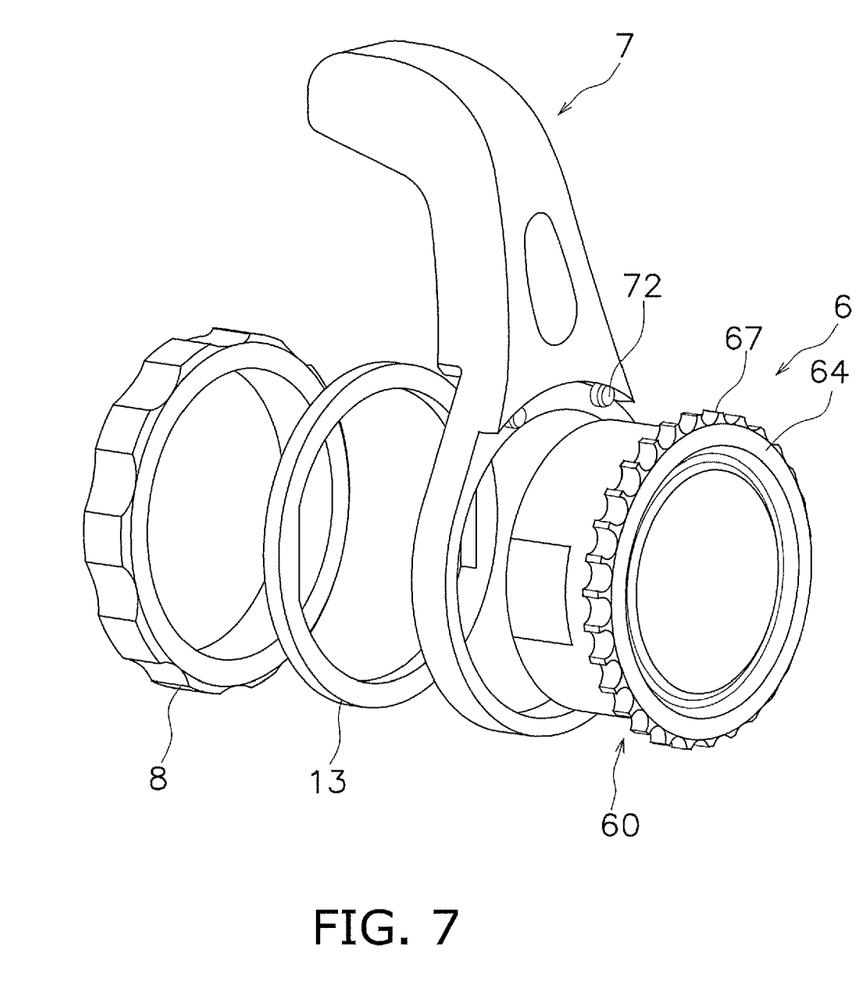
FIG. 7 is an enlarged exploded perspective view of a dual-bearing reel according to yet another modification.

Moreover, when not including the positioning member 9, the regulating member 6 can include a plurality of engaging recesses 67 on the body member 60 as shown in FIG. 7. The engaging recesses 67 are aligned in the circumferential direction. Additionally, the engaging protrusions 72 of the operating lever 7 are engaged with two of the plural engaging recesses 67 of the regulating member 6. The engaging recesses 67 are provided on, for instance, the outer peripheral surface of the flange part 64 of the regulating member 6. Moreover, the engaging protrusions 72 axially extend from the operating lever body 71 toward the flange part 64.

Furthermore, a washer 13 can be disposed between the nut member 8 and the operating lever 7. The waster 13 can be made of, for instance, metal or resin.

Modification 4

In the aforementioned preferred embodiment, the nut member 8, the positioning member 9, the operating lever 7 and the flange part 64 of the regulating member 6 are aligned in this order from the first reel body 21 side. However, the position of the positioning member 9 and that of the operating lever 7 can be reversed.

Modification 5

Figure 8:
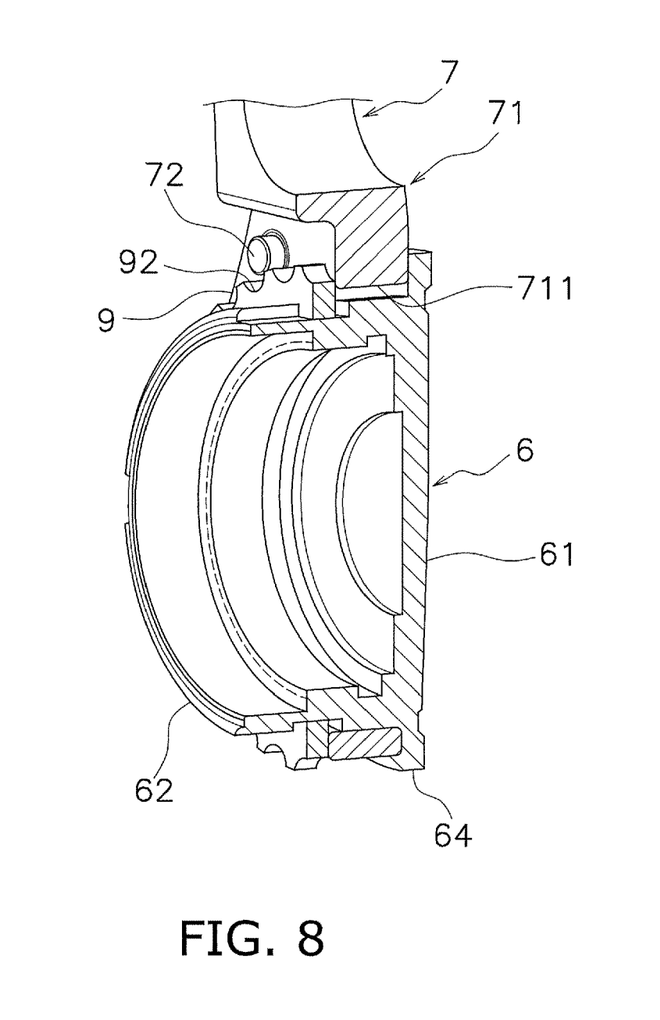
FIG. 8 is an enlarged perspective view of a dual-bearing reel according to yet another further modification.

As shown in FIG. 8, the through hole 711 of the operating lever 7 can be made in the shape of an elongated hole. Detailedly, a gap is produced between the inner wall surface of the through hole 711 and the outer peripheral surface of the tubular part 62 in the lengthwise/major-axis direction of the through hole 711. On the other hand, the inner wall surface of the through hole 711 and the outer peripheral surface of the tubular part 62 preferably make contact with each other in the transverse/minor-axis direction of the through hole 711. However, this configuration may not be necessarily employed. The engaging protrusion 72 is disposed outside the through hole 711 in the lengthwise/major-axis direction of the through hole 711.

According to this configuration, when the nut member 8 is slightly loosened, the operating lever 7 becomes movable by the aforementioned gap in the lengthwise/major-axis direction of the through hole 711. Detailedly, the operating lever 7 is radially moved to separate the engaging protrusion 72 from the engaged one of the engaging recesses 92. As a result, the engaging protrusion 72 and the engaged one of the engaging recesses 92 are disengaged, whereby the operating lever 7 becomes rotatable with respect to the positioning member 9. In other words, unlike the configuration of disengaging the engaging protrusion 72 and the engaged one of the engaging recesses 92 by axially moving the positioning member 9, the engaging protrusion 72 and the engaged one of the engaging recesses 92 can be disengaged without axially moving the positioning member 9. As a result, the axial dimension can be made compact.

Modification 6

In the aforementioned preferred embodiment, the regulating member 6 includes the plural engaging recesses 92, whereas the operating lever 7 includes the engaging protrusion 72. However, the configurations of the regulating member 6 and the operating lever 7 are not limited to the above. For example, the regulating member 6 can include at least one engaging protrusion, whereas the operating lever 7 can include at least one engaging recess. For example, the operating lever 7 can be provided with a plurality of engaging recesses circumferentially aligned about the through hole 711.

What is claimed is:

1. A dual-bearing reel comprising:
   a first reel body;
   a second reel body disposed at an interval from the first reel body in an axial direction;
   a spool disposed between the first reel body and the second reel body;
   a regulating member attached to the first reel body, the regulating member for regulating a braking force to brake rotation of the spool, the regulating member having a tubular shape, the regulating member including a screw part and a flange part, the screw part provided on an outer peripheral surface of the regulating member, the flange part extending outward from the outer peripheral surface in a radial direction;

a brake mechanism disposed within the regulating member for generating the braking force;

an operating lever attached to the regulating member, the operating lever disposed between the flange part and the first reel body; and a nut member disposed between the operating lever and the first reel body, the nut member screwed onto the screw part.

2. The dual-bearing reel according to claim 1, wherein one of the regulating member or the operating lever includes a plurality of engaging recesses, the plurality of engaging recesses aligned in a circumferential direction, and the other of the regulating member or the operating lever includes an engaging protrusion, the engaging protrusion engaged with any of the plurality of engaging recesses.

3. The dual-bearing reel according to claim 2, wherein one of the regulating member or the operating lever includes a body member and a positioning member, the positioning member non-rotatably attached to the body member, and the plurality of engaging recesses are provided on the positioning member.

4. The dual-bearing reel according to claim 2, wherein the plurality of engaging recesses are provided on the regulating member.

5. The dual-bearing reel according to claim 2, wherein the plurality of engaging recesses are provided on the operating lever.

6. The dual-bearing reel according to claim 2, further comprising:

an urging member, wherein the engaging protrusion is an engaging pin, the engaging disposed to be protrusible and retractable, and the urging member urges the engaging pin toward the plurality of engaging recesses.

7. The dual-bearing reel according to claim 2, wherein the operating lever includes a through hole, the through hole having an elongated shape, the through hole penetrated by the regulating member.

8. The dual-bearing reel according to claim 7, wherein the engaging protrusion is disposed outside the through hole in a lengthwise direction of the through hole.

9. The dual-bearing reel according to claim 2, wherein the engaging protrusion protrudes in the axial direction.

10. The dual-bearing reel according to claim 2, wherein the engaging protrusion protrudes in the radial direction.

11. A dual-bearing reel comprising:

a first reel body;

a second reel body disposed at an interval from the first reel body in an axial direction;

a spool disposed between the first reel body and the second reel body;

means for regulating a braking force to be applied to the spool, the means for regulating attached to the first reel body;

means for braking rotation of the spool by generating the braking force, the means for braking rotation of the spool disposed within the means for regulating the braking force;

an operating lever attached to the means for regulating, the operating lever disposed between the means for regulating and the first reel body; and means for locking the operating lever against axial movement, the means for locking disposed on the means for regulating between the operating lever and the first reel body.

12. The dual-bearing reel according to claim 11, wherein one of the means for regulating or the operating lever includes a plurality of engaging recesses, the plurality of engaging recesses aligned in a circumferential direction, and the other of the means for regulating or the operating lever includes an engaging protrusion, the engaging protrusion engaged with any of the plurality of engaging recesses.

13. The dual-bearing reel according to claim 12, wherein one of the means for regulating or the operating lever includes a body member and a positioning member, the positioning member non-rotatably attached to the body member, and the plurality of engaging recesses are provided on the positioning member.

14. The dual-bearing reel according to claim 12, wherein the plurality of engaging recesses are provided on the means for regulating.

15. The dual-bearing reel according to claim 12, wherein the plurality of engaging recesses are provided on the operating lever.

16. The dual-bearing reel according to claim 12, wherein the engaging protrusion is an engaging pin, the engaging pin disposed to be protrusible and retractable, and the dual-bearing reel further comprises:

means for urging the engaging pin toward the plurality of engaging recesses.

17. The dual-bearing reel according to claim 12, wherein the operating lever includes a through hole, the through hole having an elongated shape, the through hole penetrated by the means for regulating.

18. The dual-bearing reel according to claim 17, wherein the engaging protrusion is disposed outside the through hole in a lengthwise direction of the through hole.

19. The dual-bearing reel according to claim 12, wherein the engaging protrusion protrudes in the axial direction.

20. The dual-bearing reel according to claim 12, wherein the engaging protrusion protrudes in the radial direction.

* * * * *